(No Model.)
A. NITTINGER, Sr.
HOG SCRAPER AND CLAW HOOK.
No. 478,810. Patented July 12, 1892.
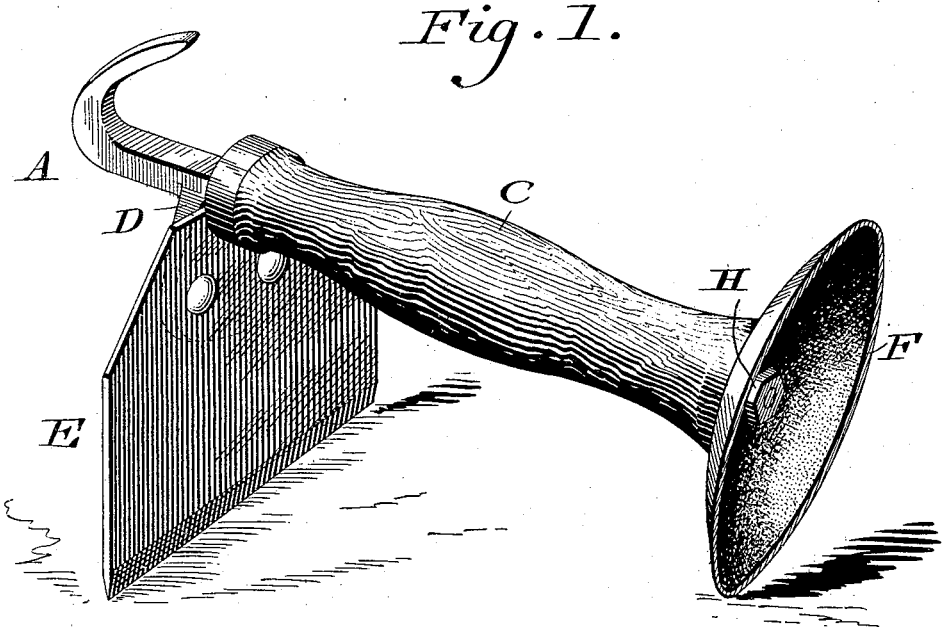
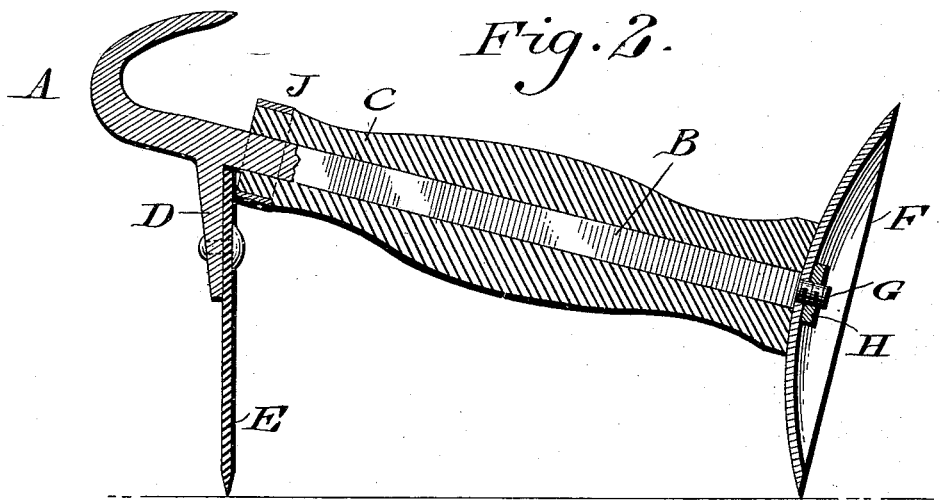
WITNESSES:
INVENTOR
ATTORNEY.

UNITED STATES PATENT OFFICE.

AUGUST NITTINGER, SR., OF PHILADELPHIA, PENNSYLVANIA.

HOG-SCRAPER AND CLAW-HOOK.

SPECIFICATION forming part of Letters Patent No. 478,810, dated July 12, 1892.

Application filed February 23, 1892. Serial No. 422,387. (No model.)

*To all whom it may concern:*

Be it known that I, AUGUST NITTINGER, Sr., a citizen of the United States, residing in the city and county of Philadelphia, State of Pennsylvania, have invented a new and useful Improvement in Hog-Scrapers and Claw-Hooks, which improvement is fully set forth in the following specification and accompanying drawings.

My invention consists of a hog-scraper formed of a blade at one end of a handle, a bell-scraper at the other end thereof, and a hook for withdrawing the claws or hoofs of the animal, substantially as described.

Figure 1 represents a perspective view of a hog-scraper and claw-hook embodying my invention. Fig. 2 represents a longitudinal section thereof.

Similar letters of reference indicate corresponding parts in the two figures.

Referring to the drawings, A designates a claw-hook, whose tang B is passed through the handle C and secured thereto. Projecting laterally and at an inclination or angle from the hook near the end of the handle is an ear D, to which is screwed or riveted the flat blade E, which thus extends at an angle from said handle, having its inner end inserted between the said ear D and the metallic band or ring J on the end of the said handle. At the end of the handle opposite to the hook is a bell-scraper F, the same being of dishing shape and having an opening centrally therein to receive the reduced end G of the tang B, said end being screw-threaded and having fitted therein the nut H, which is tightened against said scraper, and thereby firmly connects the same with the handle.

It will be seen that a combined implement is provided, each part of which may be conveniently operated without interfering with the other parts, the handle being common to all.

The tang remains firmly in the handle, as one end is restrained by the blade E or ear D, or both, and the other end by the scraper F.

The flat blade and bell-scraper are employed to scrape the body and limbs of hogs, according as required, and the hook is designed for pulling off the claws or hoofs of the animal.

Having thus described my invention, what I claim as new, and desire to secure by Letters Patent, is—

1. A hog-scraper consisting of a claw with a tang having an ear thereon, a handle on said tang, and a blade secured to said ear, substantially as described.

2. A hog-scraper consisting of a claw with a tang having an inclined ear thereon, a handle on said tang, and a blade secured to said ear and having its inner end between said ear and the end of the handle, substantially as described.

3. A hog-scraper consisting of a claw with a tang having an ear thereon, a handle on said ear, a blade secured to said ear, and a bell-scraper on a reduced threaded end of said tang, said parts being combined substantially as described.

AUGUST NITTINGER, SR.

Witnesses:
JOHN A. WIEDERSHEIM,
R. H. GRAESER.